United States Patent
Chiang

(10) Patent No.: US 7,187,508 B2
(45) Date of Patent: Mar. 6, 2007

(54) LENS DEVICE HAVING ALIGNMENT CORRECTION UNIT FOR ADJUSTMENT OF A LENS AXIS OF A LENS MODULE

(75) Inventor: Chih-Hao Chiang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/271,318

(22) Filed: Nov. 10, 2005

(65) Prior Publication Data
US 2006/0181786 A1    Aug. 17, 2006

(30) Foreign Application Priority Data
Feb. 16, 2005   (TW)   ............................... 94104462 A

(51) Int. Cl.
G02B 7/02    (2006.01)
G03B 3/00    (2006.01)

(52) U.S. Cl. ...................... 359/822; 359/811; 359/819; 353/101

(58) Field of Classification Search ........ 359/808–811, 359/819, 820, 822, 823, 826, 829, 830, 740, 359/789, 799, 422, 428, 380, 381, 389, 390, 359/383, 369, 374; 353/28, 97, 101; 396/4, 396/149, 281, 377; 606/16, 18; 600/248; 356/247
See application file for complete search history.

(56) References Cited

U.S. PATENT DOCUMENTS

| | | | | |
|---|---|---|---|---|
| 3,556,086 A | * | 1/1971 | Gordon | 600/248 |
| 4,608,980 A | * | 9/1986 | Aihara | 606/16 |
| 5,138,496 A | * | 8/1992 | Pong | 359/822 |
| 5,508,851 A | * | 4/1996 | Tachizawa | 359/822 |
| 6,111,706 A | * | 8/2000 | Incera et al. | 359/822 |
| 6,922,295 B2 | * | 7/2005 | Glassburn et al. | 359/819 |
| 6,972,910 B2 | * | 12/2005 | Orimo et al. | 359/694 |

* cited by examiner

Primary Examiner—Loha Ben
(74) Attorney, Agent, or Firm—Ladas & Parry LLP

(57) ABSTRACT

A lens device includes: a housing formed with a module-mounting hole that has a hole axis, and provided with a mounting surface that is disposed radially and outwardly of the module-mounting hole; a lens module having a lens axis; and an alignment correction unit for mounting the lens module on the housing at the module-mounting hole. The alignment correction unit includes a module barrel coupled to the lens module, an elastically deformable component clamped by the module barrel toward the mounting surface of the housing, and a set of screw fasteners for fastening the module barrel onto the mounting surface at angularly spaced apart locations relative to the hole axis. Depths of threaded engagement of the screw fasteners with the mounting surface are independently adjustable to permit adjustment of the lens axis of the lens module relative to the hole axis of the module-mounting hole.

21 Claims, 6 Drawing Sheets

LENS DEVICE HAVING ALIGNMENT CORRECTION UNIT FOR ADJUSTMENT OF A LENS AXIS OF A LENS MODULE

This application claims priority of Taiwanese Application No. 094104462, filed on Feb. 16, 2005.

BACKGROUND OF THE INVENTION

1. Field of the Invention

The invention relates to a lens device, more particularly to a lens device having an alignment correction unit for adjustment of a lens axis of a lens module.

2. Description of the Related Art

As shown in FIG. 1 and FIG. 2, a conventional angled lens device applied to a projector includes a housing 1, a first lens module 2 having a first lens axis (L1), a second lens module 3 having a second lens axis (L2), and a reflector 4. The housing 1 confines an inner space 101, and is formed with first and second module-mounting holes 102, 103. The first and second lens modules 2, 3 are mounted on the housing 1 at the first and second module-mounting holes 102, 103, respectively. The reflector 4 is mounted in the inner space 101 of the housing 1, and is disposed between the first and second module-mounting holes 102, 103. The reflector 4 has a reflecting surface 401 intersected by the first lens axis (L1) and the second lens axis (L2).

For the conventional angled lens device, since the housing 1 is difficult to manufacture, the reflector 4 is easily displaced from its ideal location in the inner space 101. In addition, manufacturing errors can easily occur in the first and second lens modules 2, 3, such that after the first and second lens modules 2, 3 are mounted respectively on the housing 1 at the first and second module-mounting holes 102, 103, the first and second lens axes (L1), (L2) cannot intersect the reflecting surface 401 at a common point (P). In other words, the lens axes (L1), (L2) of the first and second lens modules 2, 3 are misaligned, which has an adverse affect on the imaging quality.

SUMMARY OF THE INVENTION

Therefore, the object of the present invention is to provide a lens device having an alignment correction unit for adjustment of a lens axis of a lens module so as to overcome the aforesaid drawback of the prior art.

According to one aspect of the present invention, there is provided a lens device that includes a housing, a lens module having a lens axis, and an alignment correction unit. The housing is formed with a module-mounting hole that has a hole axis, and is provided with a mounting surface that is disposed radially and outwardly of the module-mounting hole. The alignment correction unit is for mounting the lens module on the housing at the module-mounting hole, such that the lens axis of the lens module is adjustable relative to the hole axis of the module-mounting hole. The alignment correction unit includes a module barrel coupled to the lens module, an elastically deformable component clamped by the module barrel toward the mounting surface of the housing, and a set of screw fasteners for fastening the module barrel onto the mounting surface of the housing at angularly spaced apart locations relative to the hole axis. Depths of threaded engagement of the screw fasteners with the mounting surface of the housing are independently adjustable to permit adjustment of the lens axis of the lens module relative to the hole axis of the module-mounting hole.

According to another aspect of the present invention, there is provided a lens device that includes a housing, a first lens module having a first lens axis, a second lens module having a second lens axis, and an alignment correction unit. The housing confines an inner space, is formed with first and second module-mounting holes in spatial communication with the inner space, and is provided with a mounting surface that is disposed radially and outwardly of the second module-mounting hole. The second module-mounting hole has a hole axis. The first lens module is mounted on the housing at the first module-mounting hole. The alignment correction unit is for mounting the second lens module on the housing at the second module-mounting hole, such that the second lens axis of the second lens module is adjustable relative to the hole axis of the second module-mounting hole to thereby adjust the second lens axis relative to the first lens axis. The alignment correction unit includes a module barrel coupled to the second lens module, an elastically deformable component clamped by the module barrel toward the mounting surface of the housing, and a set of screw fasteners for fastening the module barrel onto the mounting surface of the housing at angularly spaced apart locations relative to the hole axis. Depths of threaded engagement of the screw fasteners with the mounting surface of the housing are independently adjustable to permit adjustment of the second lens axis of the second lens module relative to the hole axis of the second module-mounting hole.

According to yet another aspect of the present invention, there is provided a lens device that includes a housing, a first lens module having a first lens axis, a reflector having a reflecting surface intersected by the first lens axis, a second lens module having a second lens axis, and an alignment correction unit. The housing confines an inner space, is formed with first and second module-mounting holes in spatial communication with the inner space, and is provided with a mounting surface disposed radially and outwardly of the second module-mounting hole. The second module-mounting hole has a hole axis. The first lens module is mounted on the housing at the first module-mounting hole. The reflector is mounted in the inner space of the housing, and is disposed between the first and second module-mounting holes. The alignment correction unit is for mounting the second lens module on the housing at the second module-mounting hole, such that the second lens axis of the second lens module is adjustable relative to the hole axis of the second module-mounting hole to permit the first and second lens axes of the first and second lens modules to intersect at a common point on the reflecting surface. The alignment correction unit includes a module barrel coupled to the second lens module, an elastically deformable component clamped by the module barrel toward the mounting surface of the housing, and a set of screw fasteners for fastening the module barrel onto the mounting surface of the housing at angularly spaced apart locations relative to the hole axis. Depths of threaded engagement of the screw fasteners with the mounting surface of the housing are independently adjustable to permit adjustment of the second lens axis of the second lens module relative to the hole axis of the second module-mounting hole.

Therefore, by utilizing the independently adjustable threaded engagements of the screw fasteners with the mounting surface of the mounting ring, and the deformable property of the elastically deformable component, alignment between the first and second lens axes of the first and second lens modules can be adjusted to improve image quality of the lens device.

BRIEF DESCRIPTION OF THE DRAWINGS

Other features and advantages of the present invention will become apparent in the following detailed description of the preferred embodiment with reference to the accompanying drawings of which.

DETAILED DESCRIPTION OF THE PREFERRED EMBODIMENT

Figure 1:
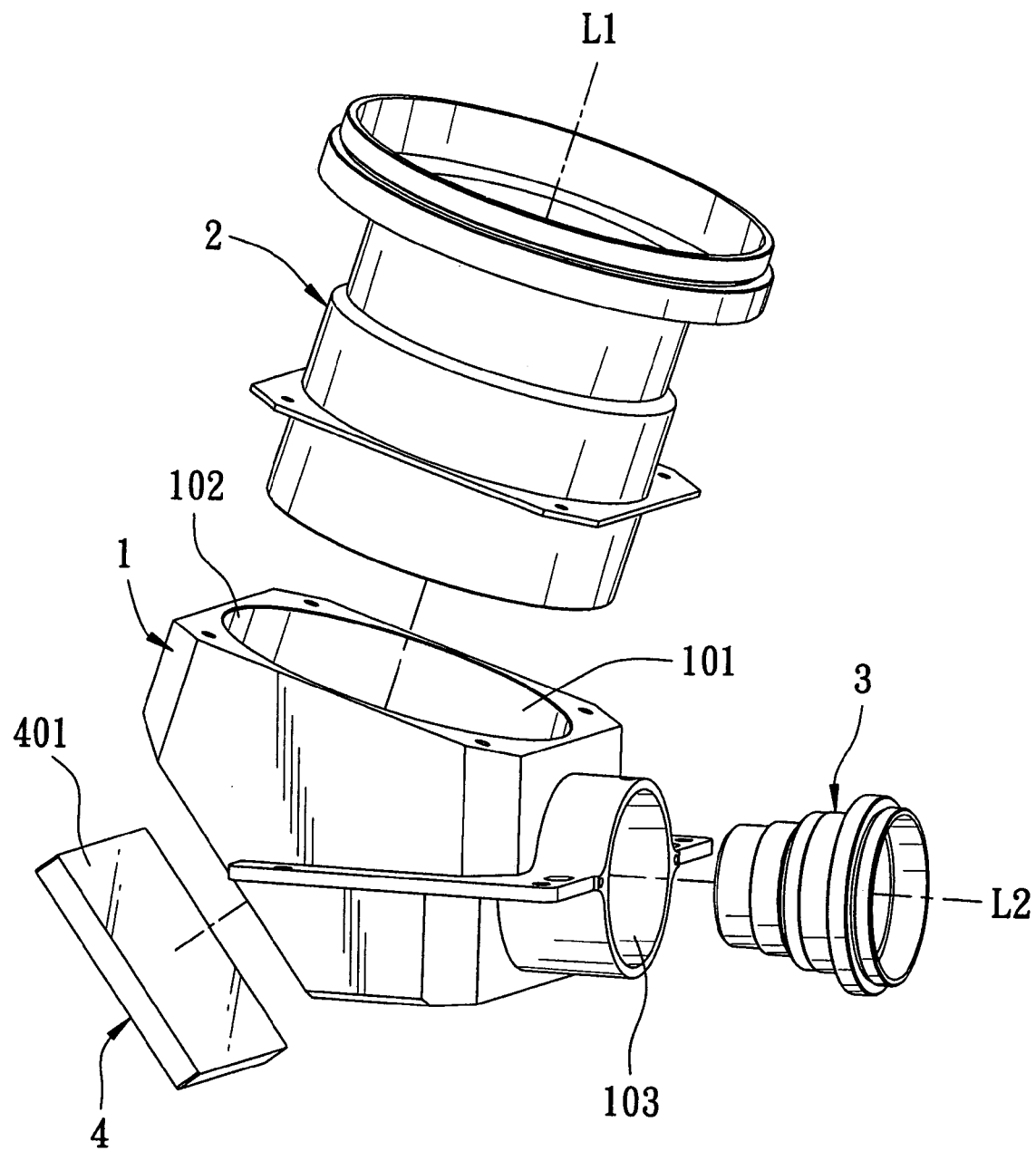
FIG. 1 is a perspective view of a conventional angled lens device.
Figure 2:
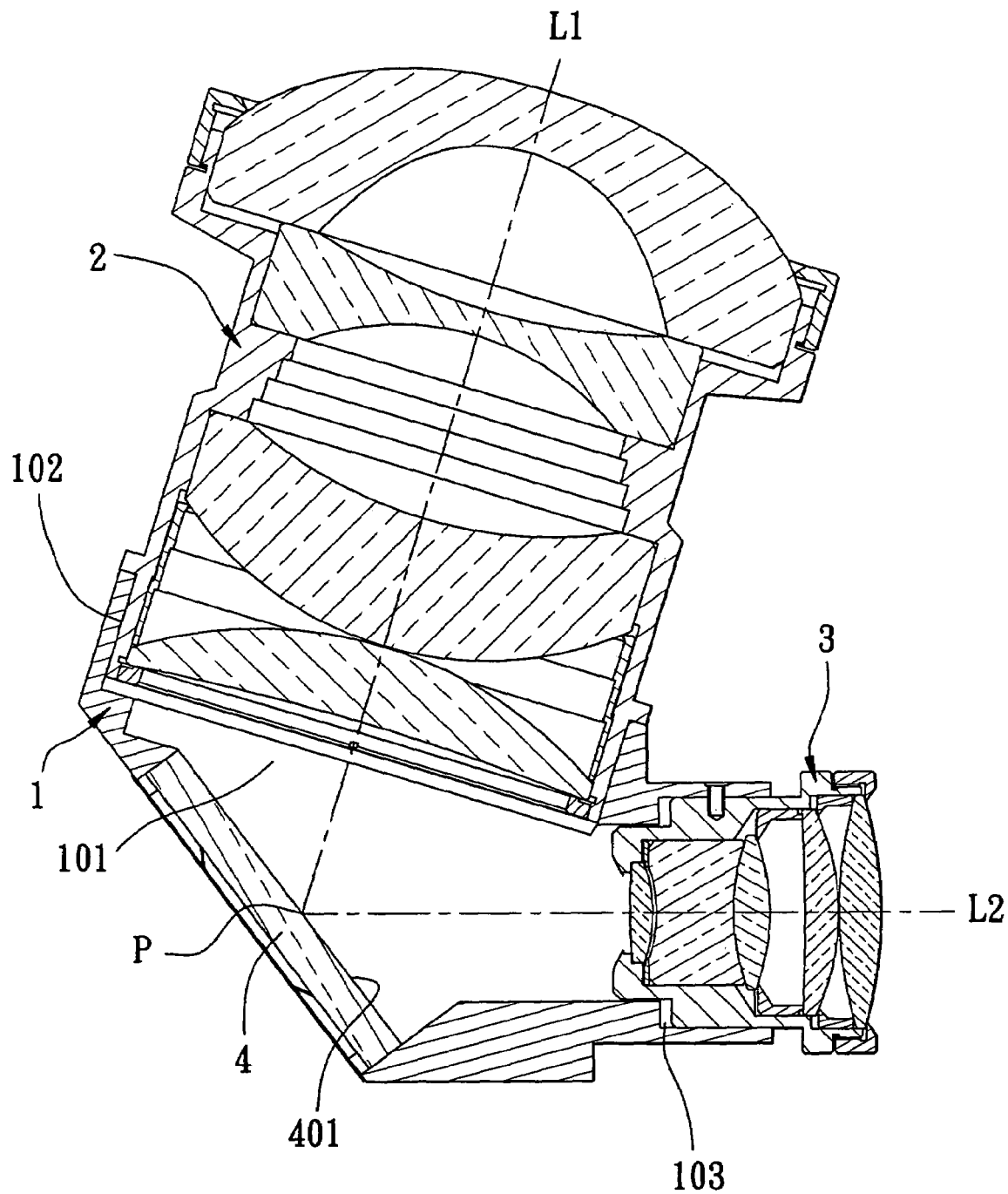
FIG. 2 is an assembled sectional view of the conventional angled lens device.
Figure 3:
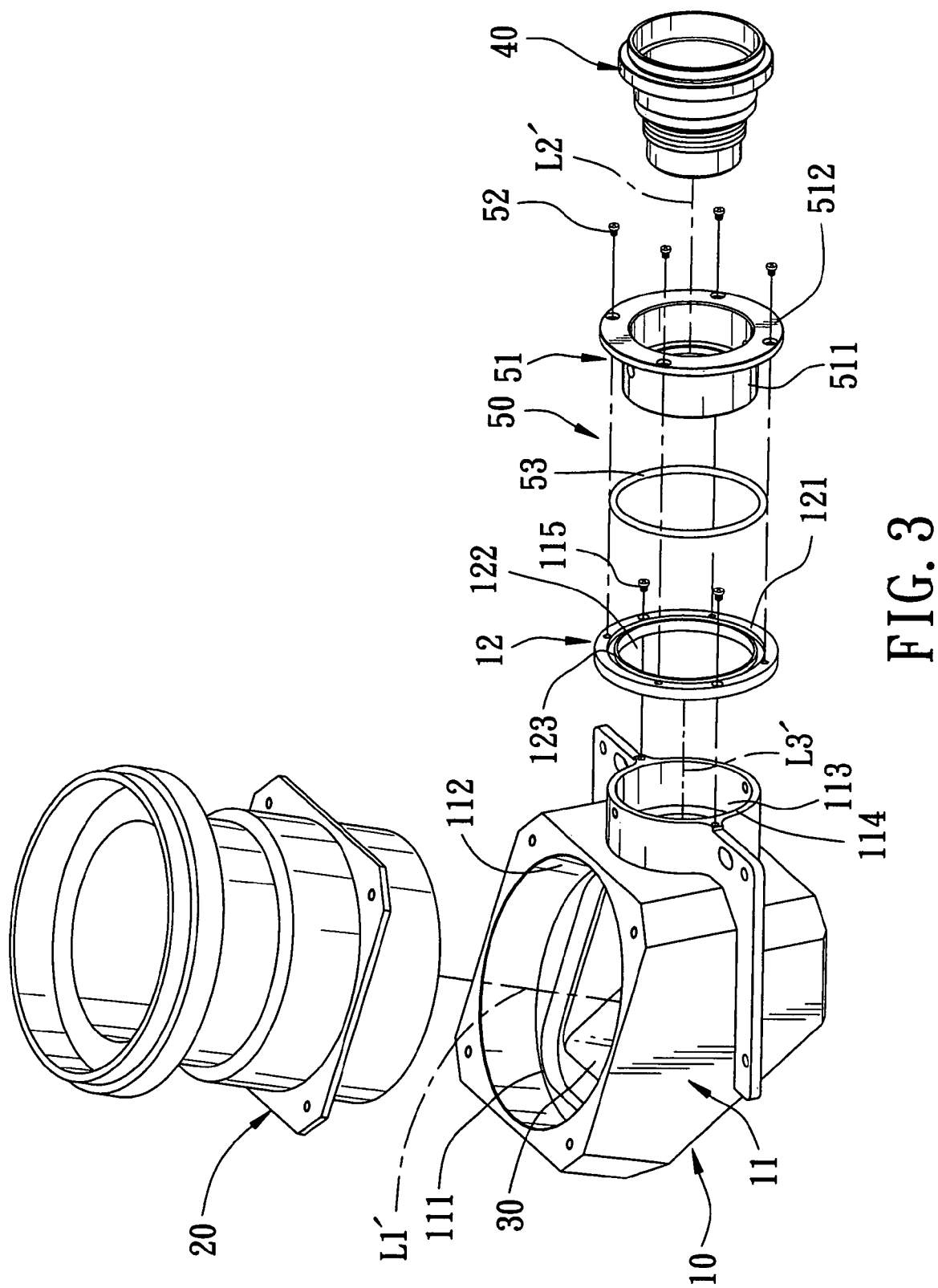
FIG. 3 is a perspective view of the preferred embodiment of a lens device according to the present invention.
Figure 4:
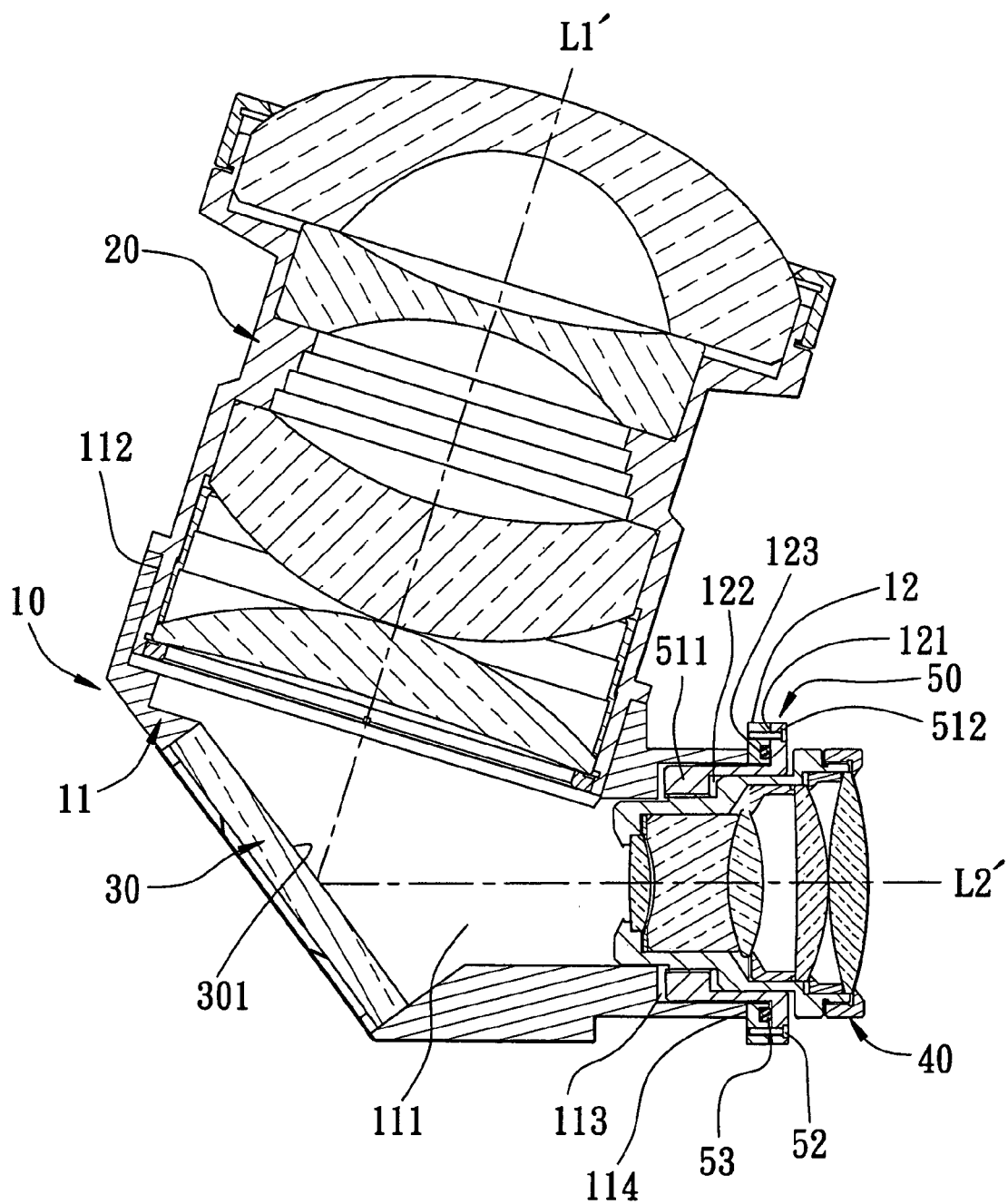
FIG. 4 is an assembled sectional view of the preferred embodiment.

As shown in FIG. 3 and FIG. 4, the preferred embodiment of a lens device according to the present invention includes a housing 10, a first lens module 20, a reflector 30, a second lens module 40, and an alignment correction unit 50.

The housing 10 includes a main body 11 and a mounting ring 12. The main body 11 confines an inner space 111, and is formed with first and second module-mounting holes 112, 113. The main body 11 has an end surface 114 that surrounds the second module-mounting hole 113. The second module-mounting hole 113 has a hole axis (L3'). The mounting ring 12 defines a ring hole 122 that is registered with the second module-mounting hole 113, and is mounted on the end surface 114 of the main body 11 with the use of screws 115. The mounting ring 12 is further formed with a mounting surface 121 that is disposed radially and outwardly of the second module-mounting hole 113, and a groove 123 that is annular in this embodiment and that surrounds the ring hole 122. It should be noted herein that the main body 11 and the mounting ring 12 can be interconnected integrally in other embodiments of this invention.

The first lens module 20 is mounted on the main body 11 of the housing 10 at the first module-mounting hole 112, and has a first lens axis (L1').

The reflector 30 is mounted in the inner space 111 of the main body 11, and is disposed between the first and second module-mounting holes 112, 113. The reflector 30 has a reflecting surface 301 intersected by the first lens axis (L1').

The second lens module 40 has a second lens axis (L2').

The alignment correction unit 50 includes a module barrel 51 coupled to the second lens module 40, a set of screw fasteners 52, and an elastically deformable component 53.

The module barrel 51 includes a tubular portion 511 extending through the ring hole 122 and into the second module-mounting hole 113 and having a cross-section with a size smaller than that of the second module-mounting hole 113 and the ring hole 122, and a flange portion 512 extending in radial outward directions from one end of the tubular portion 511 and disposed outwardly of the second module-mounting hole 113. The second lens module 40 extends into and is coupled threadedly to the tubular portion 511 of the module barrel 51.

In this preferred embodiment, there are four screw fasteners 52 that extend through the flange portion 512 of the module barrel 51 and that engage threadedly the mounting ring 12. The screw fasteners 52 fasten the module barrel 51 onto the mounting surface 121 of the mounting ring 12 at angularly spaced apart locations relative to the hole axis (L3'). The depths of the threaded engagement of the screw fasteners 52 with the mounting surface 121 are independently adjustable to permit adjustment of the second lens axis (L2') of the second lens module 40 relative to the hole axis (L3') of the second module-mounting hole 113. It should be noted herein that the actual number of the screw fasteners 52 is not limited to four. The use of three screw fasteners 52 is also sufficient to achieve the intended object.

The elastically deformable component 53 is clamped by the flange portion 512 of the module barrel 51 toward the mounting surface 121 of the mounting ring 12. The elastically deformable component 53 is disposed in the groove 123 of the mounting ring 12, and has a thickness greater than a depth of the groove 123. The elastically deformable component 53 can be in various shapes and forms that can fit into the groove 123, such as a set of elastic studs, a set of springs, or an O-ring, etc. In this preferred embodiment, the elastically deformable component 53 is an O-ring, and the groove 123 of the mounting ring 12 is an annular groove. Different parts of the elastically deformable component 53 are subjected to different degrees of compression according to the depths of threaded engagement of the screw fasteners 52 with the mounting ring 12.

Figure 5:
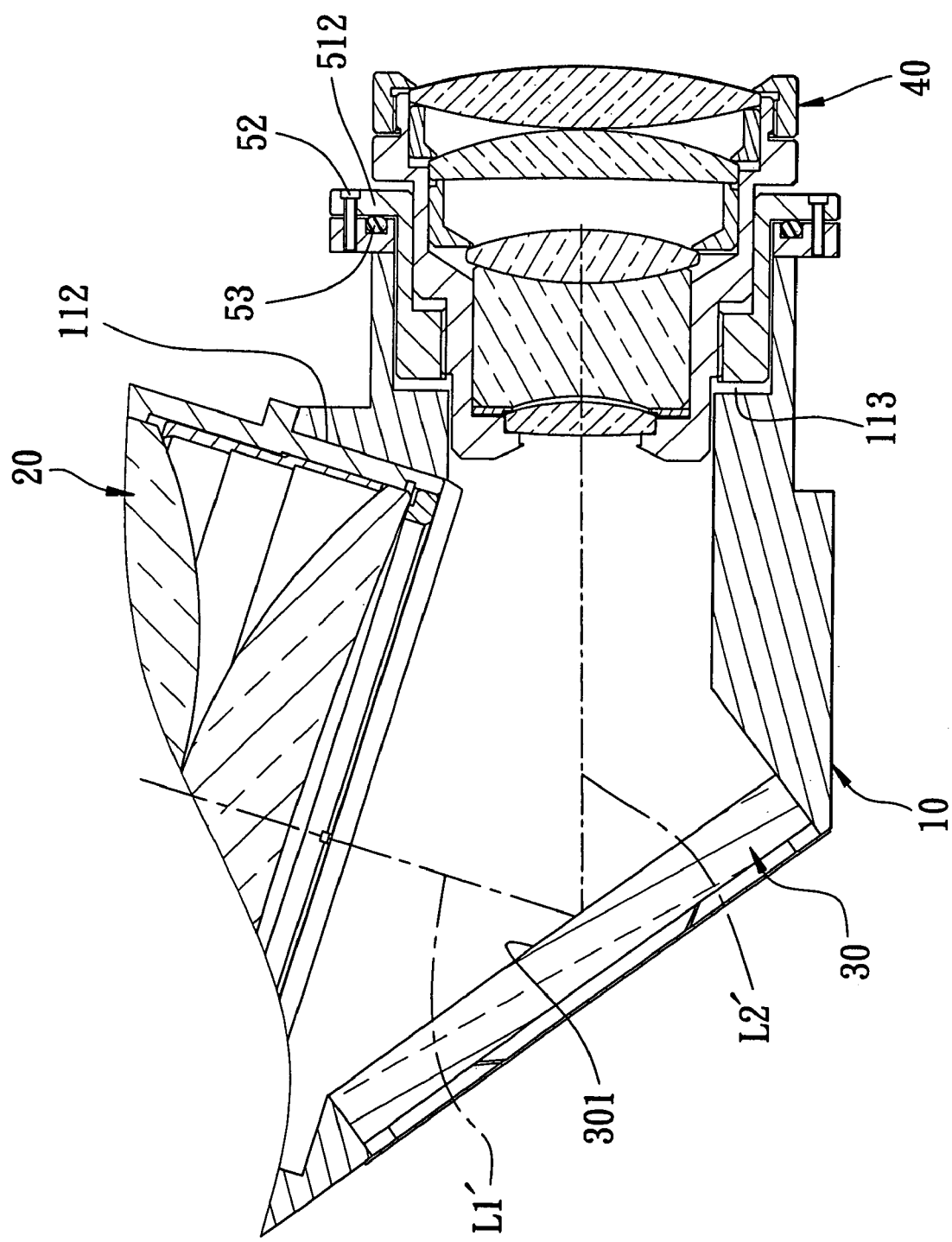
FIG. 5 is an enlarged fragmentary sectional view of the preferred embodiment, illustrating misalignment between first and second lens axes.

As shown in FIG. 5, after the lens device is assembled, the first and second lens axes (L1'), (L2') might not interest at a common point on the reflecting surface 301 of the reflector 30, either due to manufacturing errors in the housing 10 that result in an error in the placement of the reflector 30, or due to manufacturing errors in the first and/or second lens modules 20,40. Therefore, misalignment between the lens axes (L1'), (L2') of the first and second lens modules 20, 40 occurs.

Figure 6:
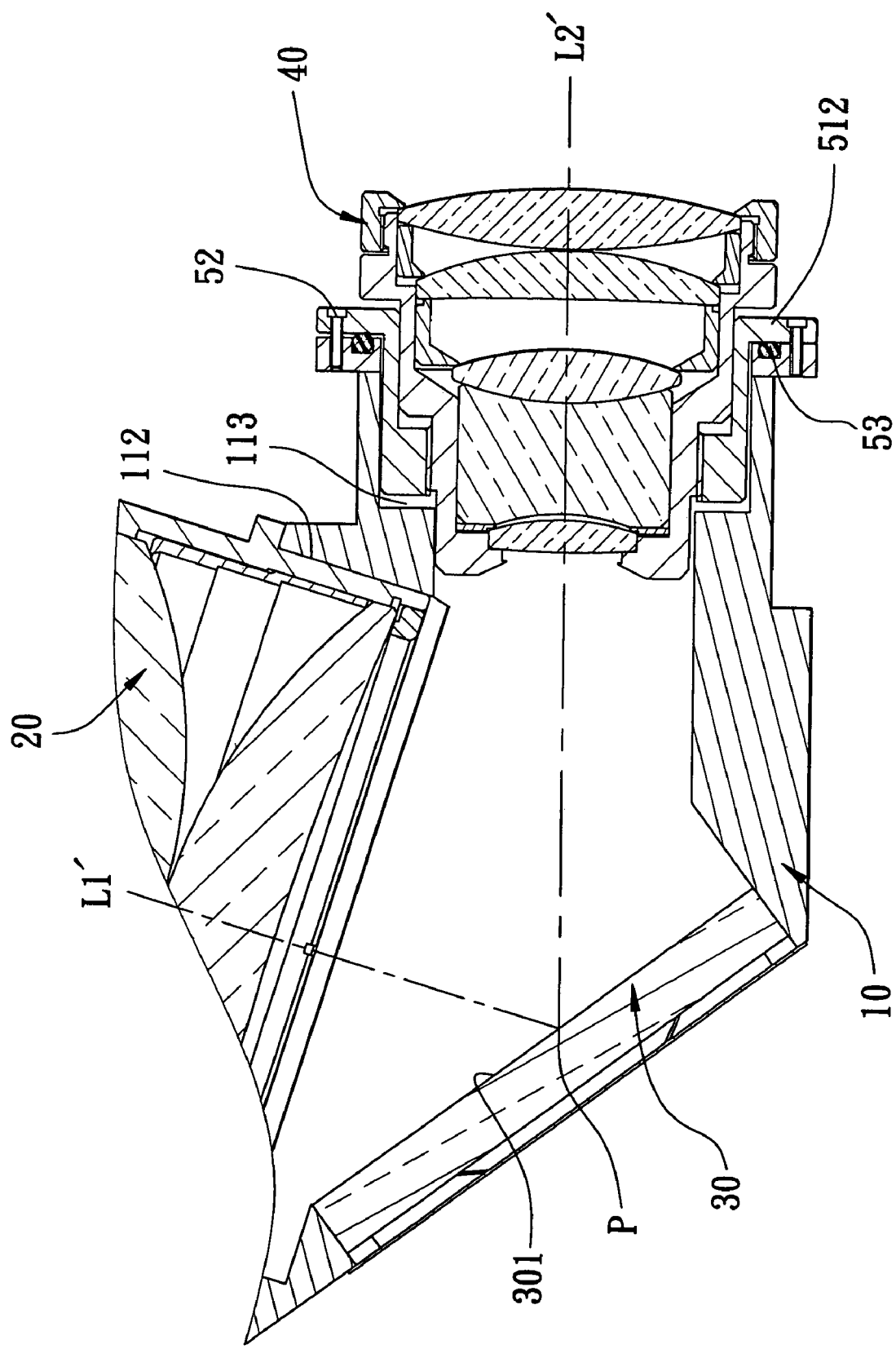
FIG. 6 is an enlarged fragmentary sectional view of the preferred embodiment, illustrating alignment correction in the lens device.

Imaging quality is affected by the alignment between the first and second lens axes (L1'), (L2'). Thus, as shown in FIG. 6, a user can use a projector to project an image through the lens device to examine the alignment of the lens axes (L1'), (L2') of the first and second lens modules 20, 40. To perform alignment correction, the user adjusts the depths of the threaded engagement of the screw fasteners 52 with the mounting surface 121 of the mounting ring 12 independently such that the module barrel 51 is tilted relative to the mounting ring 12. The size of the cross-section of the tubular portion 511 of the module barrel 51 is smaller than that of the second mounting hole 113 and the ring hole 122 to permit movement of the module barrel 51 relative to the mounting ring 12. Since the second lens module 40 is coupled to the module barrel 51, tilting the module barrel 51 relative to the mounting ring 12 is equivalent to adjusting the second lens axis (L2') of the second lens module 40 relative to the hole axis (L3') of the second module-mounting hole 113. At the same time, different parts of the elastically deformable component 53 are subjected to different degrees of compression by the flange portion 512 of the module barrel 51 according to the independently adjusted depths of the threaded engagement between the screw fasteners 53 and the mounting surface 121. The elastically deformable component 53 maintains continuous contact between the flange portion 512 of the module barrel 51 and the mounting ring 12, such that wobbling of the module barrel 51 relative to the mounting ring 12 is prevented. Alignment correction is performed until the second lens axis (L2') intersects the reflecting surface 301 of the reflector 30 at a common point (P) with the first lens axis (L1'). The quality of the image projected by the projector varies as the alignment between the first and second lens axes (L1'), (L2') varies. Hence the alignment correction is completed when the image projected is the clearest.

Therefore, by utilizing the independently adjustable threaded engagements of the screw fasteners 52 with the mounting surface 121 of the mounting ring 12, and the deformable property of the elastically deformable component 53, alignment between the first and second lens axes (L1'), (L2') of the first and second lens modules 20, 40 can be achieved to overcome misalignment therebetween due to manufacturing errors and to improve image quality of the lens device.

It should be noted herein that the present invention is not limited to those lens devices that include the reflector 30 and the second lens module 40 as in this preferred embodiment. In other words, the reflector 30 and the second lens module 40 are not essential components in other embodiments of the present invention.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A lens device comprising:
    a housing formed with a module-mounting hole that has a hole axis, and provided with a mounting surface that is disposed radially and outwardly of said module-mounting hole;
    a lens module having a lens axis; and
    an alignment correction unit for mounting said lens module on said housing at said module-mounting hole such that said lens axis of said lens module is adjustable relative to said hole axis of said module-mounting hole, said alignment correction unit including
        a module barrel coupled to said lens module,
        an elastically deformable component clamped by said module barrel toward said mounting surface of said housing, and
        a set of screw fasteners for fastening said module barrel onto said mounting surface of said housing at angularly spaced apart locations relative to said hole axis, wherein depths of threaded engagement of said screw fasteners with said mounting surface of said housing are independently adjustable to permit adjustment of said lens axis of said lens module relative to said hole axis of said module-mounting hole.

2. The lens device as claimed in claim 1, wherein said housing includes:
    a main body formed with said module-mounting hole and having an end surface that surrounds said module-mounting hole; and
    a mounting ring mounted on said end surface of said main body and formed with said mounting surface.

3. The lens device as claimed in claim 2, wherein:
    said mounting ring defines a ring hole that is registered with said module-mounting hole;
    said module barrel including
        a tubular portion extending through said ring hole and into said module-mounting hole, and having a cross-section with a size smaller than that of said module-mounting hole and said ring hole, and
        a flange portion that extends in radial outward directions from one end of said tubular portion and that is disposed outwardly of said module-mounting hole;
    said elastically deformable component being disposed between said mounting ring and said flange portion of said module barrel;
    said screw fasteners extending through said flange portion of said module barrel and engaging threadedly said mounting ring.

4. The lens device as claimed in claim 3, wherein said elastically deformable component is an O-ring, and wherein different parts of said elastically deformable component are subjected to different degrees of compression according to the depths of threaded engagement of said screw fasteners with said mounting ring.

5. The lens device as claimed in claim 4, wherein said mounting ring is formed with an annular groove to receive said O-ring therein, said O-ring having a thickness greater than a depth of said annular groove.

6. The lens device as claimed in claim 1, wherein said lens module extends into and is coupled threadedly to said module barrel.

7. The lens device as claimed in claim 1, wherein said alignment correction unit includes at least three of said screw fasteners.

8. A lens device comprising:
    a housing that confines an inner space and that is formed with first and second module-mounting holes in spatial communication with said inner space, said second module-mounting hole having a hole axis, said housing being provided with a mounting surface that is disposed radially and outwardly of said second module-mounting hole;
    a first lens module mounted on said housing at said first module-mounting hole, said first lens module having a first lens axis;
    a second lens module having a second lens axis; and
    an alignment correction unit for mounting said second lens module on said housing at said second module-mounting hole such that said second lens axis of said second lens module is adjustable relative to said hole axis of said second module-mounting hole to thereby adjust said second lens axis relative to said first lens axis, said alignment correction unit including
        a module barrel coupled to said second lens module,
        an elastically deformable component clamped by said module barrel toward said mounting surface of said housing, and
        a set of screw fasteners for fastening said module barrel onto said mounting surface of said housing at angularly spaced apart locations relative to said hole axis, wherein depths of threaded engagement of said screw fasteners with said mounting surface of said housing are independently adjustable to permit adjustment of said second lens axis of said second lens module relative to said hole axis of said second module-mounting hole.

9. The lens device as claimed in claim 8, wherein said housing includes:
    a main body that confines said inner space and that is formed with said first and second module-mounting holes, said main body having an end surface that surrounds said second module-mounting hole; and
    a mounting ring mounted on said end surface of said main body and formed with said mounting surface.

10. The lens device as claimed in claim 9, wherein:
said mounting ring defines a ring hole that is registered with said second module-mounting hole;
said module barrel including
- a tubular portion extending through said ring hole and into said second module-mounting hole, and having a cross-section with a size smaller than that of said second module-mounting hole and said ring hole, and
- a flange portion that extends in radial outward directions from one end of said tubular portion and that is disposed outwardly of said second module-mounting hole;

said elastically deformable component being disposed between said mounting ring and said flange portion of said module barrel;
said screw fasteners extending through said flange portion of said module barrel and engaging threadedly said mounting ring.

11. The lens device as claimed in claim 10, wherein said elastically deformable component is an O-ring, and wherein different parts of said elastically deformable component are subjected to different degrees of compression according to the depths of threaded engagement of said screw fasteners with said mounting ring.

12. The lens device as claimed in claim 11, wherein said mounting ring is formed with an annular groove to receive said O-ring therein, said O-ring having a thickness greater than a depth of said annular groove.

13. The lens device as claimed in claim 8, wherein said second lens module extends into and is coupled threadedly to said module barrel.

14. The lens device as claimed in claim 8, wherein said alignment correction unit includes at least three of said screw fasteners.

15. A lens device comprising:
a housing that confines an inner space, that is formed with first and second module-mounting holes in spatial communication with said inner space, and that is provided with a mounting surface disposed radially and outwardly of said second module-mounting hole, said second module-mounting hole having a hole axis;
a first lens module mounted on said housing at said first module-mounting hole, said first lens module having a first lens axis;
a reflector mounted in said inner space of said housing and disposed between said first and second module-mounting holes, said reflector having a reflecting surface intersected by said first lens axis;
a second lens module having a second lens axis; and
an alignment correction unit for mounting said second lens module on said housing at said second module-mounting hole such that said second lens axis of said second lens module is adjustable relative to said hole axis of said second module-mounting hole to permit said first and second lens axes of said first and second lens modules to intersect at a common point on said reflecting surface, said alignment correction unit including
- a module barrel coupled to said second lens module,
- an elastically deformable component clamped by said module barrel toward said mounting surface of said housing, and
- a set of screw fasteners for fastening said module barrel onto said mounting surface of said housing at angularly spaced apart locations relative to said hole axis, wherein depths of threaded engagement of said screw fasteners with said mounting surface of said housing are independently adjustable to permit adjustment of said second lens axis of said second lens module relative to said hole axis of said second module-mounting hole.

16. The lens device as claimed in claim 15, wherein said housing includes:
a main body that confines said inner space and that is formed with said first and second module-mounting holes, said main body having an end surface that surrounds said second module-mounting hole; and
a mounting ring mounted on said end surface of said main body and formed with said mounting surface.

17. The lens device as claimed in claim 16, wherein:
said mounting ring defines a ring hole that is registered with said second module-mounting hole;
said module barrel including
- a tubular portion extending through said ring hole and into said second module-mounting hole, and having a cross-section with a size smaller than that of said second module-mounting hole and said ring hole, and
- a flange portion that extends in radial outward directions from one end of said tubular portion and that is disposed outwardly of said second module-mounting hole;

said elastically deformable component being disposed between said mounting ring and said flange portion of said module barrel;
said screw fasteners extending through said flange portion of said module barrel and engaging threadedly said mounting ring.

18. The lens device as claimed in claim 17, wherein said elastically deformable component is an O-ring, and wherein different parts of said elastically deformable component are subjected to different degrees of compression according to the depths of threaded engagement of said screw fasteners with said mounting ring.

19. The lens device as claimed in claim 18, wherein said mounting ring is formed with an annular groove to receive said O-ring therein, said O-ring having a thickness greater than a depth of said annular groove.

20. The lens device as claimed in claim 15, wherein said second lens module extends into and is coupled threadedly to said module barrel.

21. The lens device as claimed in claim 15, wherein said alignment correction unit includes at least three of said screw fasteners.

* * * * *